(No Model.) 2 Sheets—Sheet 1.
O. DAHL.
ELECTRIC METER.
No. 405,249. Patented June 18, 1889.
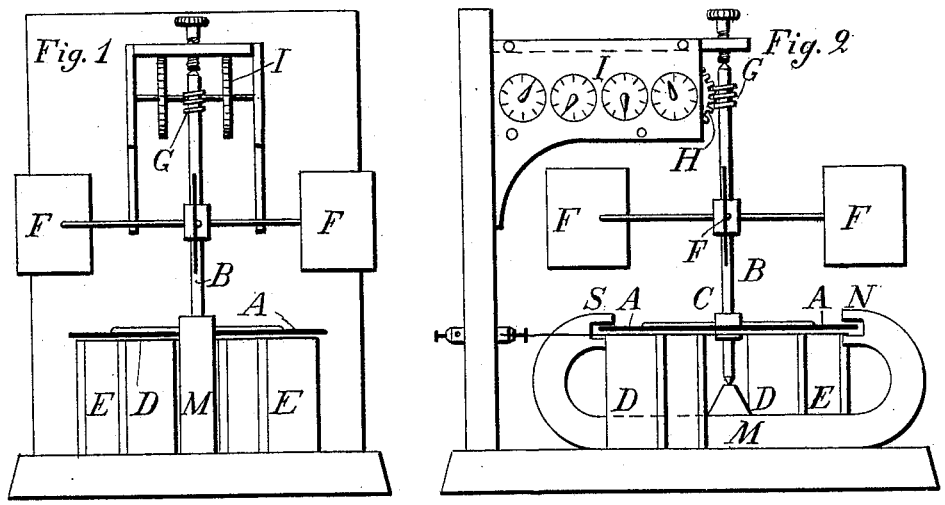
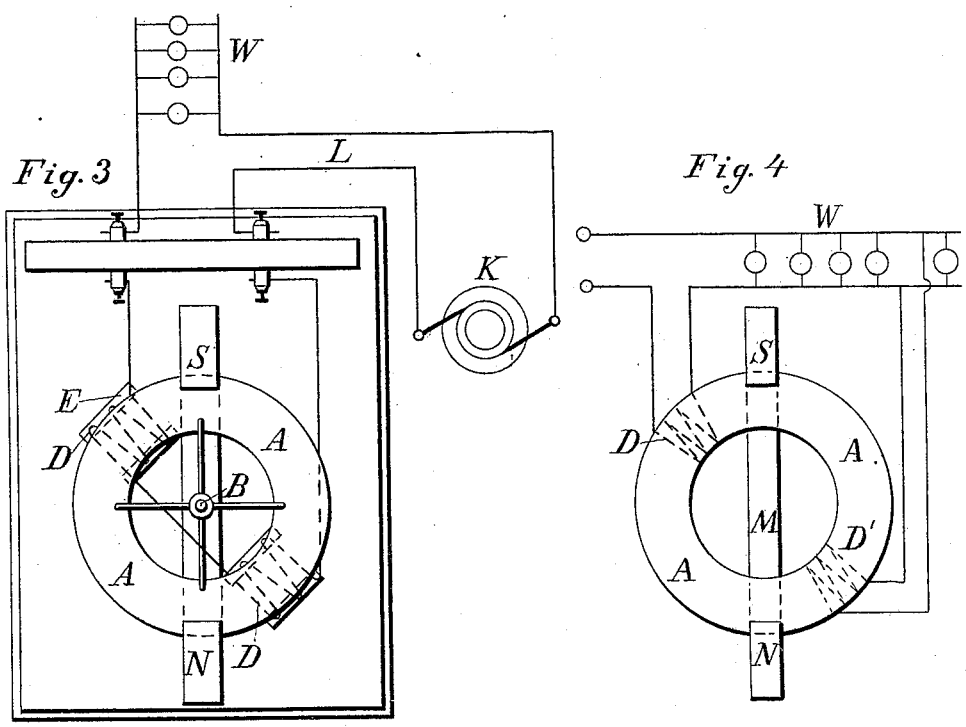
WITNESSES:
INVENTOR
Olof Dahl (No Model.) 2 Sheets—Sheet 2.
O. DAHL.
ELECTRIC METER.
No. 405,249. Patented June 18, 1889.
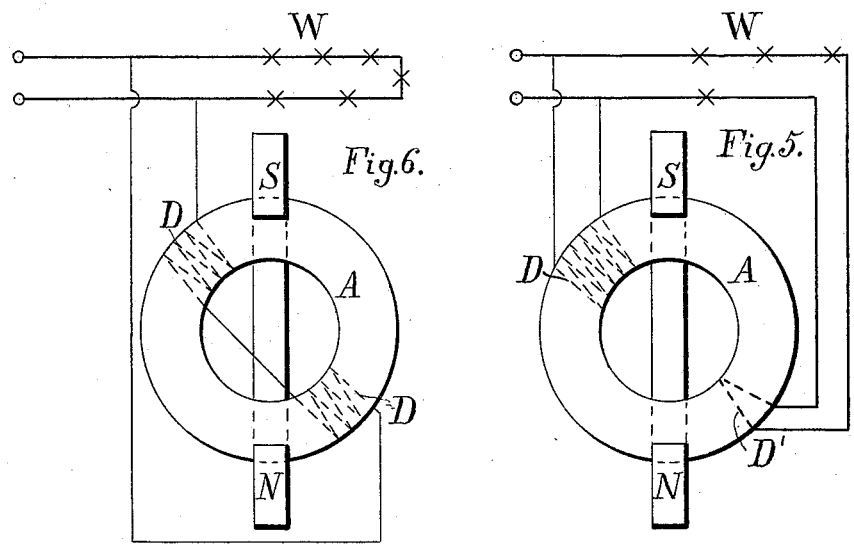
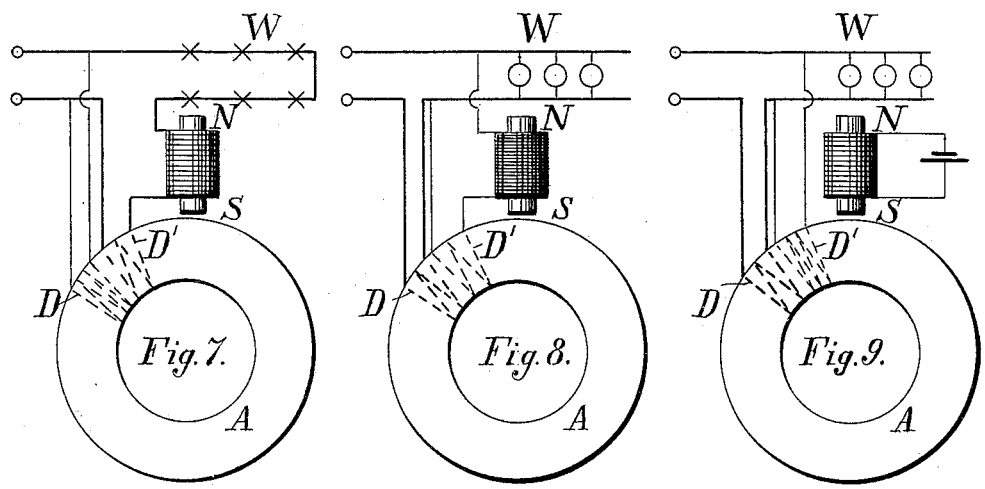
WITNESSES:
INVENTOR
Olof Dahl

UNITED STATES PATENT OFFICE.

OLOF DAHL, OF BROOKLYN, NEW YORK.

ELECTRIC METER.

SPECIFICATION forming part of Letters Patent No. 405,249, dated June 18, 1889.

Application filed March 7, 1889. Serial No. 302,382. (No model.)

*To all whom it may concern:*

Be it known that I, OLOF DAHL, a subject of the King of Sweden, and a resident of Brooklyn, in the county of Kings and State of New York, have invented certain new and useful Improvements in Electric Meters, of which the following is a specification.

My invention relates to the class of apparatus employed for measuring and recording the amount of electrical energy consumed in any given circuit or portion thereof.

The object of the invention is to provide an efficient meter which can be used for either continuous or alternating electric currents, which shall be reliable in its operation, which may be manufactured and maintained at a small expense, and which will not in itself consume any appreciable amount of energy.

Generally speaking, the meter consists of a thermo-magnetic motor driven by aid of the heat generated in a suitable heating-conductor through which the current passes proportionately as the number of translating devices using current combined with loading devices, and apparatus for registering the revolutions of the motor.

The principle of the thermo-magnetic motor is well known to be that when the pole of a magnet is brought near one side of an iron ring provided with brass spokes, by which it is pivoted at the center so as to be free to rotate in its own plane, and the iron ring is heated at a distance of about forty-five degrees of the circumference, the magnet will tend to pull the ring around, and if the frictional resistance is not too large a continuous rotation will be set up.

The details of the construction will now be described with reference to the accompanying drawings, in which—

Figure 1 is a view showing the meter in end elevation; Fig. 2, a view showing the meter in side elevation; Fig. 3, a plan of the meter as its appears after the removal of the registering mechanism and the retarding device; and Figs. 4 to 9, diagrams giving different methods of connecting the heating-conductor and exciting the field-magnet of the motor.

Referring to the figures by letter, A represents a circular armature, of soft iron or other magnetic material, preferably in the shape of a dish, in order to be heated and cooled off quickly. It is fixed to a shaft or spindle B by means of spokes of brass or other non-magnetic material. The shaft is placed on hardened points to reduce friction. The armature is thus pivoted so as to be free to rotate in its own plane. D is a conductor, of platinum or other high-resistance material, of such dimensions as to be heated by the electric current to be measured. In order to keep the resistance of this heating-conductor constant with varying temperature, one part of it may be made of a material whose resistance increases with increasing temperature—such as platinum—and another part of a material whose resistance decreases with increasing temperature, such as carbon.

The heating-conductor D is placed on the stalls E under the disk A in such a manner as to heat it in places diametrically opposite each other and unsymmetrically with respect to the poles N S of the magnet M. The stalls E may be covered at the top with mica or other incombustible material, or the whole stall may be made of slate.

The magnet M may be a permanent steel magnet, or it may be an electro-magnet. When the meter is to be used with distribution of alternating electric currents, the electro-magnet must be excited by a continuous current from some auxiliary source, such as a galvanic battery. With a continuous-current distribution the electro-magnet may be excited by a current from the main, either in shunt to the translating devices or in series therewith, or a combination of both. A permanent steel magnet is, however, preferred.

In order to produce a rate of rotation directly proportional to the energy supplied to the circuit, it is necessary that the force of the retarding device should increase in its effect as the heating effect of the current. Such a retarding effect may be given in many different ways. In the present instance the retardation is secured by the application of one or more fans or vanes F to the shaft B. The resistance offered by the air to the rotation of these vanes affords the required retardation. Any suitable means may be employed for modifying the retarding effect of these fans—as, for instance, altering the pitch of the fan-blades.

For registering the number of revolutions of the armature performed in a given time, which in a meter constructed in this manner are directly proportional to the energy consumed by the translating devices during that time, a counting or registering train I, of any well-known construction, may be employed. The spindle or shaft B is at its upper end supplied with a worm G, gearing into wheel-work of such proportions as to give convenient means of reading off the number of revolutions performed by the armature A.

To overcome the resistance offered by the moving train, a maintaining force might be applied mechanically to the counting-wheels, or a constant source of heat may be employed sufficient to counteract the frictional power, but not enough to keep the armature rotating when there is no translating consuming energy. This and other well-known modifications of construction will be well understood by the skilled constructer.

The heating-conductor D is connected in the circuit in the proper manner to suit individual cases. Thus in Fig. 3 it is shown as connected in the circuit L of the generator K in series with the work-circuit W. The resistance of the heating-conductor D may be very small and the energy consumed in operating the meter itself quite insignificant.

In Figs. 4 and 5 the same general arrangement as shown in Fig. 3 is employed; but in addition to the series conductor D there is employed another heating-conductor D', of high resistance, connected as a shunt across the conductors leading to the work-circuit W. When employed on a circuit of constant or nearly constant potential difference, as is shown in Fig. 4, the shunt-conductor may have a small constant heating effect, hardly sufficient to overcome the friction of the wheel-work, the rate of rotation being dependent on the series conductor. When employed on a circuit of constant current, as is shown in Fig. 5, the heating effect of the series conductor may be nearly enough to overcome the friction, the rate of rotation being dependent on the electro-motive force, or, in other words, on the number of translating devices operated in series on a circuit included by the shunt-conductor.

In Fig. 6 the arrangement shown in Fig. 3 is employed on a constant-current circuit. In other words, the heating-conductor, having a large resistance, is placed in shunt around the translating devices.

In Figs. 7 and 8 are shown modifications of the arrangements shown in Figs. 5 and 6, in that the magnet is an electro-magnet excited by the same current as that giving the constant heating effect for overcoming the friction.

In Fig. 9 the magnet is excited by a galvanic battery.

Having described my invention, I claim—

1. The combination of a thermo-magnetic motor, a heating-conductor or heating-conductors heating, when traversed by electric currents, the armature of said motor in proper places to make it revolve, a retarding or loading device applied to the armature of said motor, and a device for counting or registering the revolutions of said armature.

2. The combination of a thermo-magnetic motor, a heating-conductor or heating-conductors heating, when traversed by electric currents, the armature of said motor in proper places to make it revolve, and a device for counting or registering the revolutions of said armature.

3. The combination of a thermo-magnetic motor deriving its source of heat from heating-conductors traversed by electric currents in direct proportions as the electric energy consumed, a retarding device applied to said motor, and a registering or indicating device actuated by the movements of the motor.

In testimony whereof I have hereunto signed my name in the presence of two subscribing witnesses.

OLOF DAHL.

Witnesses:
 ERNST F. JONSON,
 AND. JANSSON.